US00RE41597E

(19) United States
(12) Reissued Patent
Kirkpatrick

(10) Patent Number: US RE41,597 E
(45) Date of Reissued Patent: Aug. 31, 2010

(54) SYSTEM AND METHOD TO MAINTAIN CHARGE OF VEHICLE BATTERY USING LIGHT ENERGY

(76) Inventor: Mark Kirkpatrick, 2945 Camary Place Dr., Conyers, GA (US) 30094

(21) Appl. No.: 11/705,574

(22) Filed: Feb. 13, 2007

Related U.S. Patent Documents

Reissue of:
(64) Patent No.: 6,856,116
Issued: Feb. 15, 2005
Appl. No.: 10/630,866
Filed: Jul. 31, 2003

U.S. Applications:
(63) Continuation of application No. 09/949,984, filed on Sep. 12, 2001, now Pat. No. 6,617,822.

(51) Int. Cl.
*H01M 10/46* (2006.01)

(52) U.S. Cl. ..... 320/101
(58) Field of Classification Search ..... 320/101, 320/104, 126, 137; 323/906; 136/244, 245, 136/293
See application file for complete search history.

(56) References Cited

U.S. PATENT DOCUMENTS 4,786,851 A * 11/1988 Fuji et al. ..... 320/101
5,156,568 A * 10/1992 Ricci ..... 454/129
5,228,925 A * 7/1993 Nath et al. ..... 136/251
5,489,002 A * 2/1996 Streiff ..... 180/65.31
5,570,000 A * 10/1996 Kowalski ..... 322/1
5,644,207 A * 7/1997 Lew et al. ..... 320/101
5,839,816 A * 11/1998 Varga et al. ..... 362/153.1
5,897,156 A * 4/1999 Hayard et al. ..... 296/136.13
5,905,356 A * 5/1999 Wells ..... 320/101
6,448,740 B1 * 9/2002 Kirkpatrick ..... 320/101
6,617,822 B1 * 9/2003 Kirkpatrick ..... 320/101

* cited by examiner

*Primary Examiner*—Edward Tso
(74) *Attorney, Agent, or Firm*—Connolly Bove Lodge & Hutz LLP

(57) ABSTRACT

A system for and method for charging or maintaining a charge of a battery of a vehicle is disclosed. The system utilizes a light-transforming cell that can transform light energy to current. The cell may be supported such that the cell is exposed to light energy. Current produced by the cell is communicated with the battery through electrical connectors, which may have a switch. This invention may decrease occasions when a vehicle operator faces a weakened or dead battery in a vehicle because the invention serves to maintain the charge of the vehicle's battery when the vehicle is not in use.

27 Claims, 5 Drawing Sheets

SYSTEM AND METHOD TO MAINTAIN CHARGE OF VEHICLE BATTERY USING LIGHT ENERGY

Matter enclosed in heavy brackets [ ] appears in the original patent but forms no part of this reissue specification; matter printed in italics indicates the additions made by reissue.

This is a continuation of U.S. patent application Ser. No. 09/949,984, filed Sep. 12, 2001 now U.S. Pat. No. 6,617, 822, which is herein incorporated by reference in its entirety.

BACKGROUND

1. Field of the Invention

The present invention is directed to a system for and method of maintaining a charge of a vehicle battery using light energy.

2. Background of the Invention

A common gasoline-powered vehicle may use a 12-volt direct current (DC) battery to provide electrical power to enable the vehicle to start, and an alternator to provide electrical power when the vehicle is running, i.e., already turned on. The battery also may be used to provide electricity when the alternator is inactive. The alternator also may provide electricity to charge the battery when the vehicle is running.

However, sometimes, the battery uses more power than it receives. When this happens, such a battery typically loses its power and becomes weak or "goes dead", such as, for example, when vehicle head lights are left on after the vehicle is turned off. With a weak or dead battery, the vehicle typically cannot be started easily or at all. An operator of the vehicle may then be stranded in an undesirable location at an inopportune time.

A typical method of recharging a weak or dead battery includes directly connecting the weak or dead battery with a "live" battery from another vehicle. When the vehicle containing the "live" battery is turned on, the weak or dead battery receives charge from the live battery. After a period of time, the weak or dead battery regains sufficient power to turn on the vehicle in which it resides. This method, although relatively time-efficient, requires having the proper electrical connectors, for example, jumper cables, and aid from another vehicle having a live battery. However, operators of other vehicles may be reluctant to waste their time to aid an operator of a vehicle with a dead battery for various reasons. Furthermore, there may actually be no one around to aid the operator with the vehicle with a dead battery, such as, for example, when the operator becomes stranded in the evening in a large garage or parking lot.

Other conventional systems or methods of charging a vehicle battery typically include a converter device that converts typical alternating current (AC), for example, from a household electrical socket outlet, to DC to charge the vehicle battery. Although such AD/DC power converter systems eliminate the need for aid from another vehicle having a live battery, other limitations of this system make it still unfavorable for persons encountering their vehicle having a dead battery.

Typical limitations of home power converters include, for example, location and time constraints. Conventional vehicle battery charging systems that typically are used at home are limited because they tend to be large, bulky, and heavy. Furthermore, an operator of a vehicle typically does not transport such conventional charging systems in the vehicle because of the large size and weight of such systems.

Additionally, an electrical socket may be needed for such systems, thereby limiting their use to places where such a socket is readily available for use, thereby explaining why use at home, although limiting, is most common.

Furthermore, several hours may be needed to fully charge a battery of a vehicle. Thus, an operator may inconveniently need to leave a vehicle stationary for long periods of time in order to let the battery charge completely. If a battery becomes "dead" at a location other than an operator's home, then it may be inconvenient and undesirable to charge the battery at such a location. Typically, the operator is faced with the added inconvenience of having to either seek a charge of the dead battery from another driver, or have the vehicle towed back to the operator's home so that the battery may be charged for an extended duration of time, for example, overnight.

Therefore, an alternative charge system and method, other than the typically home-use charge systems for batteries and methods described above, are desirable.

Furthermore, it would be desirable for an alternative charge system to be usable at multiple locations, other than pre-designated locations, thereby giving an operator of a vehicle multiple choices of locations to use to charge the battery of a vehicle. It would further be desirable to be able to use the charge source for a vehicle at as many convenient places as possible, for example, at home or at work.

Finally, it also would be desirable to perform charging of a vehicle battery using resources that do not harm the environment or result in high expense to an operator or owner of the vehicle. It further would be desirable to use a charge source that does not deplete any of the earth's natural resources and, instead, is capable of using energy from an inexhaustible source, such as the sun.

SUMMARY OF THE INVENTION

The present invention is a system and method for charging and/or maintaining the charge of a battery of a vehicle. The system comprises a light-energy transforming cell, such as a photovoltaic cell, that can convert light energy incident upon the cell into electric current. The cell is connectable to a battery of a vehicle through a conventional electrical connector connectable between the cell and a receiving area in the vehicle. The receiving area communicates with the battery of the vehicle. Thus, light from an ambient source induces the light-energy transforming cell to convert the light energy into electric current, which is carried by the charge-carrying wire to the battery vehicle, thereby charging the battery.

The present invention addresses and overcomes the drawbacks of having to recharge a battery of a vehicle for extended periods of time at designated locations.

Thus, the present invention provides numerous advantages, not the least of which is that charging or maintaining the charge of a battery of a vehicle may be performed at virtually any location with a sufficient light source, including at an owner's home or office.

It is therefore an object of the present invention to provide a system for using light energy to charge and/or maintain the charge of a battery of a vehicle.

It is another object of the present invention to provide a system that is easy to install and operate, and economical to use.

It is another object of the present invention to provide a system that may be used anywhere there is a sufficient light source to activate the energy transforming cells into creating electric current.

It is yet another object of the present invention to provide a method that is easy to follow and requires minimal steps to implement.

It is a further advantage of the present system to provide a method for using light energy to maintain the charge of a battery of a vehicle.

It is another object of the present invention to use solar energy as a light source to maintain the charge of the battery of a vehicle.

These and other objects of the present invention will become apparent upon a reading of the following detailed description in conjunction with the accompanying drawings.

It is to be understood that both the foregoing general description and the following detailed description are exemplary and explanatory only and are not restrictive of the invention, as claimed.

The advantages and purpose of the invention will be set forth in part in the description that follows, and in part will be obvious from the description, or may be learned by practice of the invention. The advantages and purpose of the invention will be realized and attained by means of the elements and combinations particularly pointed out in the appended claims.

DETAILED DESCRIPTION OF THE INVENTION

Figure 1:
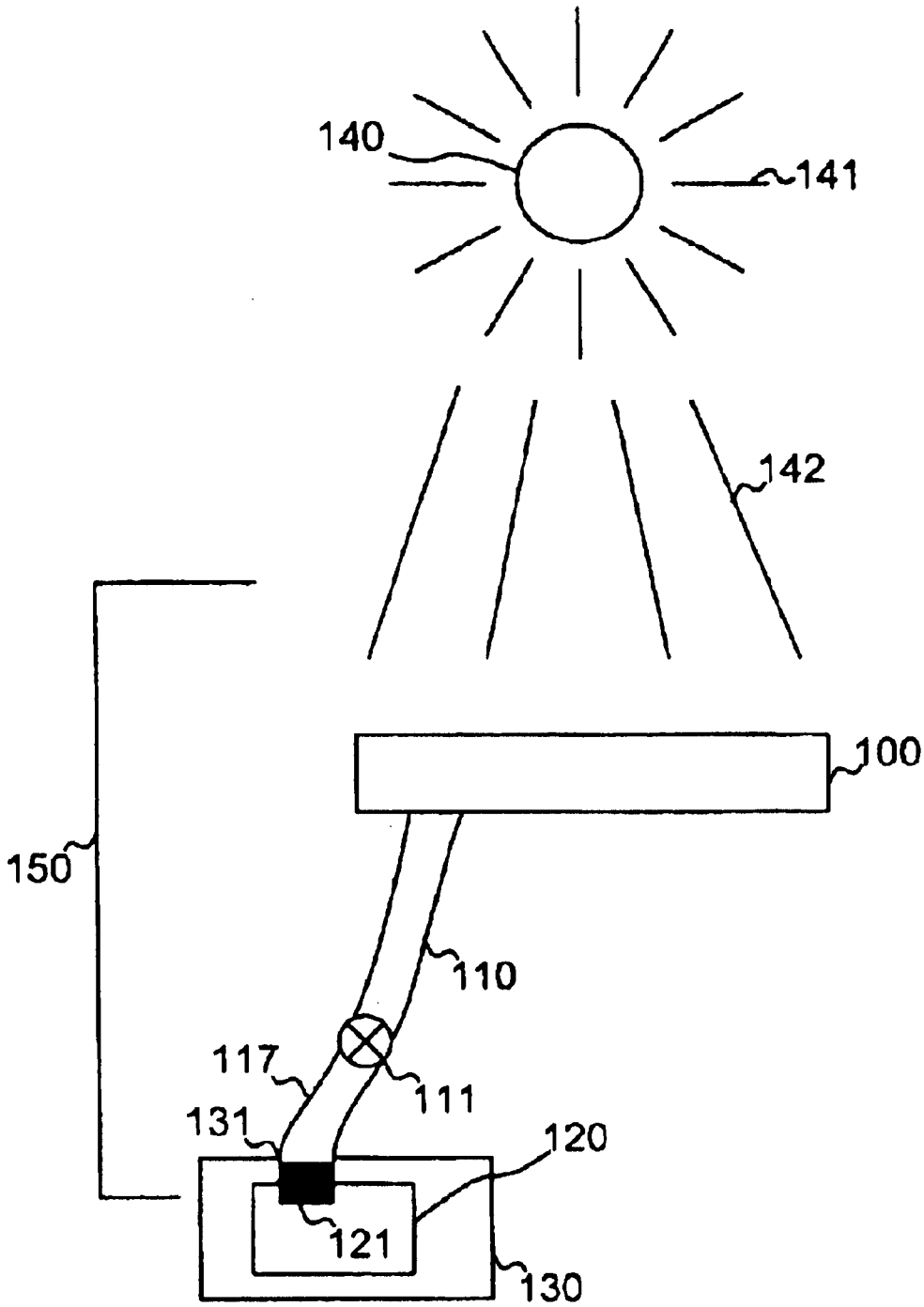
FIG. 1 is a schematic diagram of an exemplary system for maintaining the charge of a battery of a vehicle.

Throughout this disclosure, the term "vehicle" is used to generally describe any machine, typically used for transport, that utilizes electrical power for operation through an electric power reserve, such as, for example, a battery. Typical vehicles may include, but are not limited to having, a designated space for an operator, such as a driver or conductor. Such vehicles may include, but are not limited to, automobiles, trucks, buses, tractors, dune buggies, motorcycles, scooters, ships, boats, jet skis, airplanes, helicopters, trains, trolleys, gondolas, or the like. Other machines included in the definition of "vehicle", as used herein to describe the invention of the present application, and used in conjunction with the present invention, typically may not have a designated space for an operator. Such typically vehicles without a designated space for an operator include, but are not limited to: lawn mowers; farm equipment; any remote-controlled machines, such as for example, cars, planes, helicopters, boats, and motorcycles; or the like. The vehicle, as described above, may be gasoline-powered, electric-powered, solar-powered, or other energy powered.

The present invention provides a system and method for charging and/or maintaining the charge of a battery of a vehicle given a sufficient light source. Using a light source, such as, but not limited to, for example, light from the sun, the system and method of the present invention promotes the maintenance of the charge of a battery of a vehicle. The battery must be charged while the vehicle is stationary, such as, for example, in a parking lot at the work place of its operator, or while the vehicle is parked at the operator's home. The battery also may be charged while the vehicle is in motion. The operator of an electric-powered vehicle may allow the vehicle battery to be charged while the vehicle is parked anywhere there is sufficient light to generate power via power-converting means, such as, for example, a cell. As used throughout this disclosure, a "cell" may be, for example, a device, an apparatus, a contraption, a gadget, or the like, that is capable of receiving light from any light source and converting energy received from the light source into electric current, either AC or DC. As just one non-limiting example, photovoltaic cells may be used to transform energy from a light source into electric current. In a non-limiting exemplary embodiment, photovoltaic cells may be used to collect power from available light, such as sunlight, and output current, created from the transformation of light into current, to charge a battery.

The system and method of the present invention may also give an operator of a vehicle greater confidence that the vehicle will not have a weak or dead battery. If the system and/or method of the present invention are utilized regularly, the battery in connection thereto will be continually "topped off", thereby ensuring that the battery does not become drained or dead when the vehicle is not in operation. With the capability of having the battery of a vehicle be undergoing a charge whenever the vehicle is not in operation, there is greater confidence that the vehicle will be ready to operate when needed, decreasing the fear that the battery may have been drained in the inoperative time period.

Reference will now be made in detail to the present exemplary embodiments of the invention, examples of which are illustrated in the accompanying drawings. Wherever possible, the same reference numbers will be used throughout the drawings to refer to the same or like parts.

In the illustrated embodiment, as depicted in FIG. 1, a system 150 is shown for charging a battery 120 of a vehicle 130 that includes an energy-converting means, such as, for example, a cell 100. The cell 100, as defined above, may be, for example, any device that can transform light energy 142 from a light source 140 that emits a light 141 into electrical current, used to charge the battery 120. One such cell 100 may be, for example, a photovoltaic cell, such as silicon photovoltaic cells, gallium arsenide photovoltaic cells, amorphous silicon photovoltaic cells, cadmium sulfide photovoltaic cells, or other semiconductor photovoltaic cells. However, cell 100 is not limited to photovoltaic cells and may be any type of generator that can transform light energy into DC or AC.

The light source 140 may be any source that emits any natural or artificial light energy, including, for example, but not limited to, the sun, fluorescent light sources, incandescent light sources, flames, reflections, lasers, or the like. The light 141 emitted by the light source 140 generally may light the surrounding of the light source 140, such as, for example, a conventional light bulb, or alternatively, the light source 140 may be concentrated to direct the light in a given path, such as flood lights or lasers.

The light energy 142 detected by the cell 100 may have been generated as a result of light 141 from a single light source 140 or multiple light sources of the same or different types, as described above. The light energy may be continuous, such as from a continuous light 141 from a light source 140, or it may be discontinuous, as from a flickering or flashing light 141 from a flickering or flashing light source 140.

The energy-transforming cell 100 is in communication with a battery 120, typically through one or more current carrying means or devices, such as electrical connectors 110, 117. The connectors 110, 117 may be, for example, but not limited to, electrical wires or cables. A switch 111 may be positioned between the cell 100 and the battery 120 to allow means to control current flow from the cell 100 to the battery 120, such as, for example, through use of a conventional on/off switch. Alternatively, the switch 111 may be used to vary the magnitude of current that travels between the cell 100 and the battery 120, giving more control to an operator with regard to the time period required and rate of charge of the battery 120. Such a means for variable current control may be through, for example, a conventional current-limiting switch. Such a current-limiting switch may be beneficial when a pre-set current transferring rate may be too high, for example, damaging, for a given battery.

Alternatively, switch 111 may be a permanent or semi-permanent receiving component of the vehicle 130 that is specifically designed to receive a connector 110. A non-limiting example of a semi-permanent receiving component may be a removable plug, such as, for example, a weather-proof quick-connect plug. In a vehicle 130 having a permanent receiving component 111, a second electrical current carrier 117, in addition to the first electrical current carrier 110, may permanently connect the vehicle battery 120 to the receiving component 111. The second current carrier 117 may be constructed from the same material as the first carrier 110, and may be, for example, a wire or cable. The two cables 110 and 117 may be connected through the plug 111, and thereby the system 150 connected to the vehicle 130 in seconds. This provides for easy installation and removal of the system 150 without the inconvenience of connecting all the wires, for example, by going under a hood of a vehicle. When the receiving component is permanent, an existing component of the vehicle 130 may be used, such as, for example, a common cigarette lighter adapter or other electrical outlet that is capable of charging the battery 120 when a current is input into the outlet.

An additional advantage of having switch 111 be a permanent or semi-permanent component of the vehicle 130 is that the connector 117 may then be permanently connected between the battery 120 and the switch 111. Thus, an operator need only connect connector 110, connected to the system 150, to the switch 111 to enable the system 150 to maintain the charge of the battery 120. This exemplary embodiment with connector 117 permanently attached between the battery 120 and the switch 111 may eliminate the need to open the hood of the vehicle and try to gain access to the battery 120.

The connection between the cable 117 and the battery 120 may be a connection area 121 that allows the cable 117 to electrically connect with interior components of the battery 120. This connection area 121 may be directly on the surface of the battery 120, such as, for example, posts on a battery. However, the connection area 121 may also be interior of the battery 120.

The cell 100 is connected through the cable 117 to the vehicle 130 through a vehicle connection point 131. The connection point 131 may be any point where the cable 117 may physically enter or connect to a frame or physical structure of the vehicle 130. For example, the connection point 131 may be, for example, an opening in the body of the vehicle 130 to allow the cable 117 to gain access to the battery 120. Alternatively, the connection point 131 may be a pre-designated position, such as, for example, a slot, in the body of the vehicle 130 that enables the connector 110 to communicate with a pre-designated wiring system (not shown) of the vehicle 130. When the pre-designated wiring system of the vehicle 130 connects to the battery 120, it eliminates the need to physically connect the charging system 150 directly to the battery 120. Such an example of the latter connection point 131 may be, for example, an electrical socket slot that connects with the battery 120 of the vehicle 130, such as, for example, a cigarette lighter slot.

Figure 2:
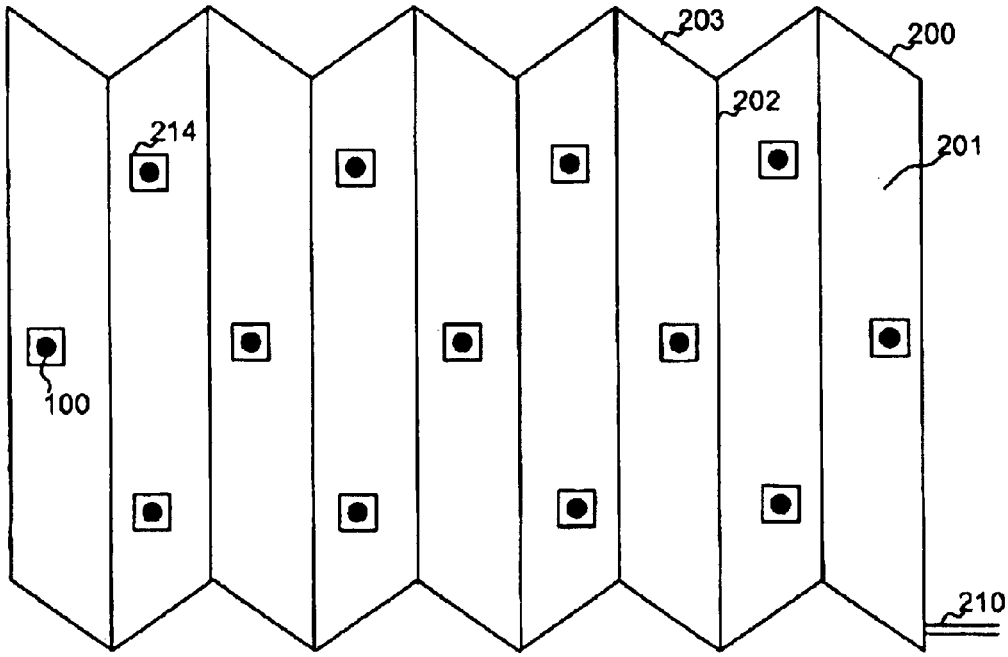
FIG. 2 is a light-facing side of an exemplary embodiment of the invention in the form of a conventional vehicle sunshade.

The system 150 may be implemented on a number of cell support means, such, for example, portable platforms. One exemplary embodiment of a portable platform is a conventional sunshade, typically placed inside the front windshield or other window of a vehicle to block out the radiation effects of the sun, maintain a cooler interior of the vehicle, and preserve the interior materials from fading and cracking. FIG. 2 depicts such a sunshade 200. A conventional sunshade 200 typically has a number of creases 202 that enable the sunshade 200 to easily fold into a substantially flat configuration for ease of handling and storing while not in use. The sunshade 200 may have a number of panels 203 separated by the creases 202. The panels 203 may be of substantially equal dimensions and are folded on top of each other when the sunshade 200 is folded, in an accordion-like fashion, and put away for later use. The sunshade 200 preferably is also placed in the vehicle 130 such that it can be most directly exposed to a source of light.

In an exemplary embodiment of the invention, a sunshade 200 is depicted having one or more energy transforming cells 100 that are positioned so that a light-receiving side of the cells 100 is adjacent a designated front side 201 of the sunshade 200. Each cell 100 may be covered by a protective sheet 214, which will be described in more detail below.

Figure 3:
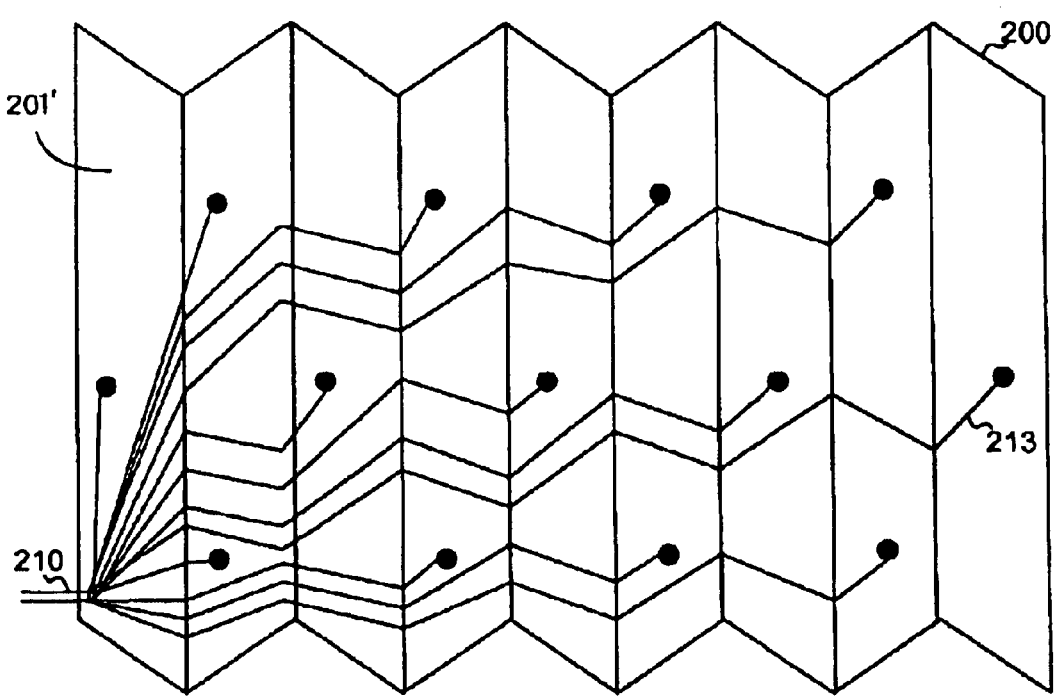
FIG. 3 is the opposite side of the exemplary embodiment depicted in FIG. 2.

As depicted in FIG. 3, the sunshade 200 also may have a back side 201', which is opposite the front side 201. The back side 201' may support one or more electrical connectors 213, which may be, for example, electrical conducting wires or cables, that lead into an output connector 210, which may be the same as cable 110, or electrically connected to cable 110. Output connector 210 may carry a sum current to the battery 120 created by all of the currents generated by each cell 100 and delivered to the output connector 210 via individual wires 213. The output connector 210 may be attached to a convenient corner side of the sunshade 200. All connectors 110, 117, 210, 213 may be attached to adjacent structures through suitable attaching means, such as, for example, glue, epoxy, tape, fasteners, snaps, pins, or the like. For example, wires 213 may be attached to the back 201' of the sun shade 200 through a suitable attaching means, such as by, for example, epoxy. Care must be taken to ensure that the attaching means does not interfere with the function of the connectors.

Figure 4:
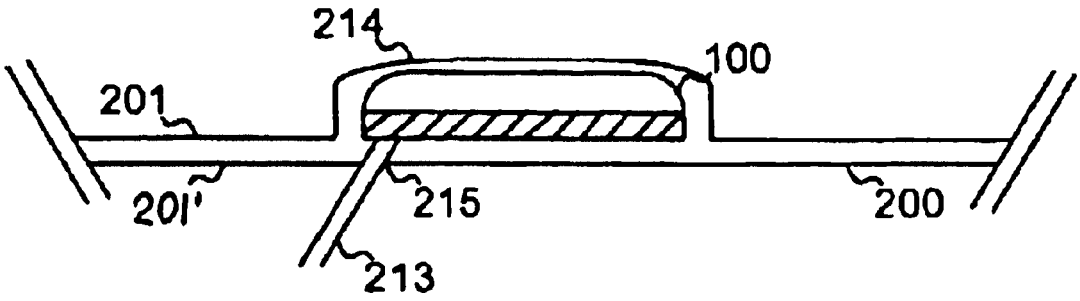
FIG. 4 is an exemplary embodiment of a cell chamber wherein a light-transforming cell 100 is housed in conjunction with one embodiment of this invention.

The cell 100 may be attached to the front side 201 of the sunshade 200, as depicted in FIG. 4. The cell 100 typically attaches to the front side 201 by suitable attaching means, such as those described above, such as for attaching the wires 213 to the back 201' of the sunshade 200. Alternatively, the cell 100 may be supported by the sunshade 100 by being partially inserted into the body of the sunshade 200 by a supporting hole (not shown). In the alternative embodiment using a supporting hole, a friction fit may be sufficient to promote support of the cell 100 onto the sunshade 200. Furthermore, care must be taken to ensure that the attaching means for attaching the cell 100 to the sunshade 200 does not adversely affect the function or integrity of the cell 100 or sun shade 200.

An opening 215, such as a hole, in the sun shade 200, typically large enough to pass the wire 213 therethrough, passes from the cell 100 on the front side 201 to the back side 201' of the sun shade 200. A protecting means, such as, for example, a cover, sheet, layer, surface, coating, or the like, may be used to protect the cell 100 from external elements that may cause damage to the cell 100. For example, a protective sheet 214 may protect against damage from dust, debris, moisture, liquids, or the like, that may cause damage to the cell 100 if allowed to be in contact with the cell 100. Furthermore, the protective sheet 214 further promotes the stable positioning of the cell 100 on the surface of the sunshade 200. The protective sheet 214 may be a translucent material to let light therethrough to the cell 100, and relatively sturdy to protect the cell 100 from external contaminants, as listed above. Exemplary protective sheets may be composed of, for example, a clear glass or plastic, preferably a material that is transparent in the near-infrared, visible, and near-UV regions of the spectrum. The edges of the protective sheet 214 may be secured to the sun shade 200 through conventional securing means known in the art, such as, for example, adherent, tape, staple, clip, fastener, or the like.

The exemplary embodiment of this invention in the form of a sunshade 200 described above and depicted in FIGS. 2–4 is only one example of the implementation of the present invention and is not intended to be limiting. The present invention may be used with any vehicle, as defined above, and attached to any suitable material associated with the vehicle that is capable of supporting the invention and wherein the cell 100 is exposed to light energy.

Figure 5:
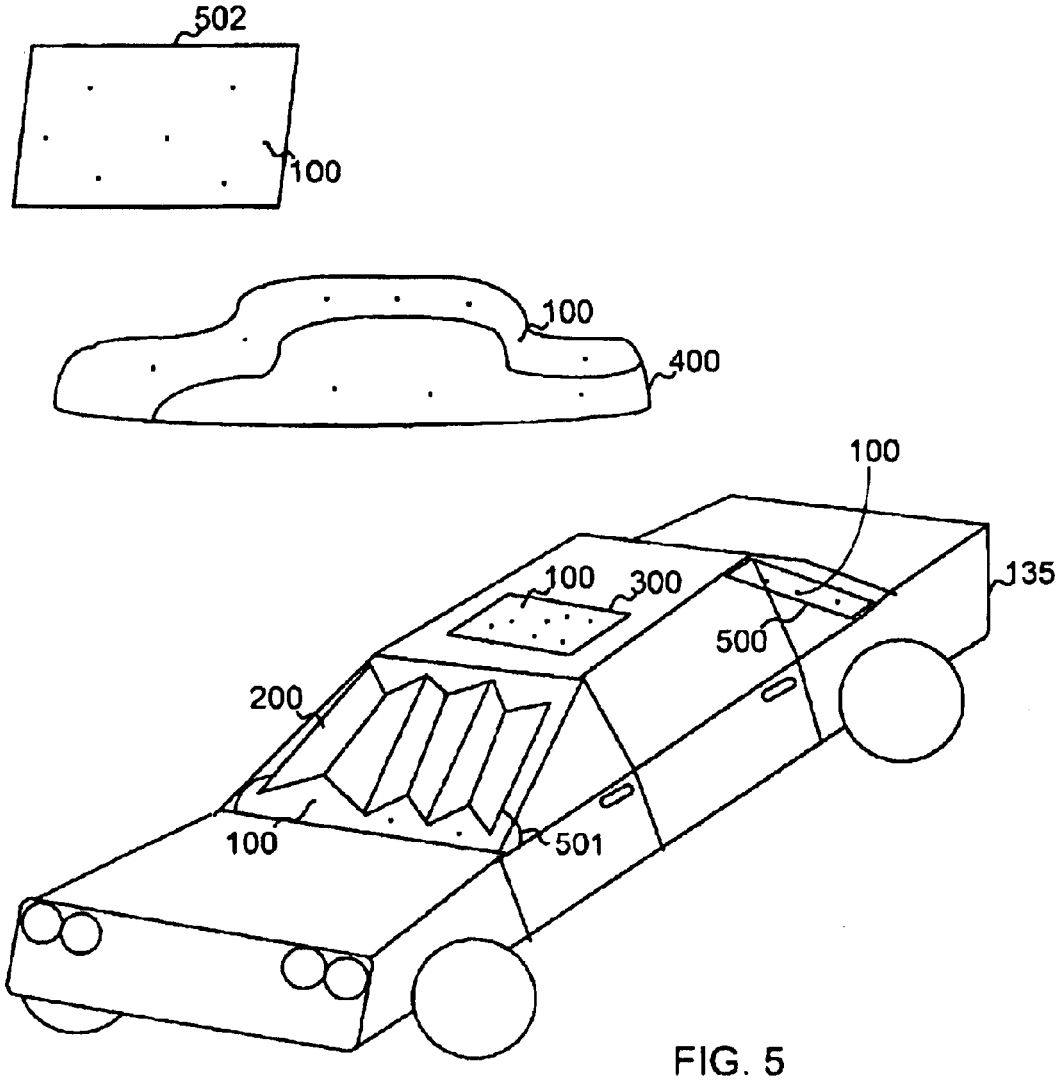
FIG. 5 is a side perspective view of a vehicle showing examples of exemplary embodiments of this invention.

The exemplary embodiment described above was used in conjunction with a conventional, lightweight, and portable device, such as a sunshade 200, to promote ease in understanding the invention as a recharge system 150. However, the recharge system 150 also may be used in conjunction with other cell support means, such as, for example, conventional, lightweight, and portable devices, such as a conventional vehicle cover 400, such as for an automobile 135, as depicted in FIG. 5. An advantage of incorporating the recharge system 150 of the invention with a vehicle cover 400 is that there is greater surface area on the cover 400 to enable larger numbers of cells 100 to be supported thereon. Furthermore, the cover 400 also may keep the entire automobile 135 cool by protecting the vehicle's exterior finish and interior material from heat-generating light, for example, from the sun.

The sunshade 200 and the cover 400 are exemplary embodiments of the system 150 of the present invention being incorporated into portable and temporary devices that are not typically permanently part of a vehicle, typically are lightweight, relatively inexpensive, and conventional. Thus, a interested owner of a vehicle may be able to purchase such temporary devices having a system 150 incorporated therein from stores that typically sell such "after-market" devices. Use of such temporary, portable devices having a system 150 incorporated therein would ensure that an operator making use of such a device in conjunction with a vehicle would be assumed that the battery of the vehicle would be prevented from being drained during non-use of the vehicle. Stated differently, use of this temporary device would decrease the chance of an operator facing a drained battery upon use of a vehicle carrying the battery therein.

Frequent use of, for example, the sunshade 200 described above, with a vehicle 130 would decrease the chance of an operator having a weak or dead battery 120 upon use of the vehicle 130 because the system 150 of the present invention would serve to keep the battery 120 properly charged. The system of the present invention, thus, may serve to fully charge a battery 120, partially charge battery 120, "top off" a battery 120 when the battery voltage is lower than ideal, for example, below 12 volts, or just to ensure that the battery 120 is at expected voltage. A voltage sensor switch (not shown) may be used with the system and method of this invention to maintain the voltage of the battery 120 within an expected range, not lower or higher than a pre-set limit. The higher voltage limit on the sensor switch may prevent the battery 120 from being over-charged.

There may be persons who would want to have the system 150 of the present invention already permanently incorporated into a vehicle, electing not to buy such a system through the after-market. Thus, alternatively, the recharge system 150 of the present invention may be made part of a cell support means that is a relatively fixed component of a vehicle, such as the automobile 135 depicted in FIG. 5. Examples of such relatively fixed components, include, but are not limited to: a conventional sun/moon roof (and/or sun/moon roof sliding shield, which is typically positioned between the glass and an operator) 300; a back shelf 500 just inside a back windshield of a vehicle 135; a front dashboard area 501 just inside a front windshield; along any sides, and typically out of driver or passenger eyesight, of glass panes of windshield, side, or quarter windows; within a holding structure of clear signal or other lights of the vehicle; or the like. An advantage of a recharge system 150 built into a relatively fixed component of a vehicle is that any wiring used for the system may be hidden from view and thereby less prone to damage or clutter. Such a recharge system 150 pre-integrated into a fixed component of a vehicle may be optional or standard equipment on new vehicles. Such a system 150 permanently incorporated in a vehicle 130 would serve to ensure that the battery 120 is continually monitored and charged and prevent occasions where the battery 120 becomes weak or drained during the course of non-use of a vehicle. Furthermore, because the system 150 is permanently integrated into a component of the vehicle 130, this eliminates the need to set up or connect the system 150 whenever the vehicle is parked or stopped. Such a system could automatically work whenever a vehicle is parked or inoperative to ensure that the battery will be in operative and charged condition when the vehicle is to be used.

In a further embodiment, the system 150 of the present invention may be incorporated into a permanently-fixed device 502, not integral with a vehicle. For example, it may be desirable to have the system 150 be part of a roof or wall of a building structure that is in proximity to a vehicle, but not in, on, or part of the vehicle. Thus, whenever the vehicle is parked at, in, or near such a permanently-fixed device 502, an operator typically need only connect a suitable connector, such as cable 210 from the device 502 to the vehicle 135. Garage roofs and doors are suitable exemplary embodiments of such a permanently-fixed device 502.

In another exemplary embodiment of the present invention, a method is disclosed for maintaining the charge of a chargeable battery 120 of a vehicle 130 using light energy 142. An energy-transforming cell 100, that can convert light energy 142 received from a light source 140 into electrical current, is exposed to such a light source 140. Upon exposure to the light energy 142, the cell 100 is induced to create electric current. The electric current is communicated with the battery 120 using one or more connectors, such as connectors 110, 117, thereby charging the battery. Upon satisfactory charge of the battery 120, the cell 100 may be disconnected form the battery 120 by, for example, opening a switch 111, described above, located in the connector line. The system 150, if not integral with the vehicle 130, may then be put away for use at a later time.

It will be apparent to those skilled in the art that various modifications and variations can be made in the systems and methods of the present invention and in construction of this system without departing form the scope and spirit of the invention. As an example, the material on which one or more transformer cells 100 are connected thereto may be electrically positioned to trap light energy upon turning off of a vehicle, for example, by vertically moving panels that are positioned interior of the side glass windows and are vertically movable to block sunlight, hid any valuables inside the vehicle from outside view, and as described by this invention, trap light energy to charge the battery. Furthermore, the number of cells 100 on a particular supporting material or device, such as the exemplary embodiment depicting a sunshade 200, may be varied, with a greater number of cells 100 typically producing a quicker charge rate for a battery 120, but also increasing the cost and components of the device on which the system 150 resides. Thus, the number of cells 100 that should be used on a particular support structure may be determined by weighing the desire for higher charge rates versus costs associated with increased number of cells 100. If a vehicle is typically parked in places where there is lower available light to produce light energy, a support structure for the cells 100 having a higher number of cells 100 is more practical. Finally, the system and method of the present invention, although illustrated above for use with a single vehicle for sake of simplicity, may be easily modified to charge more than one vehicle, or different vehicles simultaneously, by utilizing additional wiring to charge the vehicles in series or in parallel, as would be known to one having ordinary skill in the art.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specifications may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for charging or maintaining a charge of a battery, the system comprising:

plurality of parallel means for converting light energy received from a light source into electrical current;

means for communicating electrical current from each converting means with a battery, wherein each converting means has its own independent communicating means distinct from communicating means of converting means; and means for controlling the rate of current flowing into the battery;

wherein a charge of the battery is maintained or increased when each converting means converts light incident upon a cell into electrical current.

2. The system of claim 1, further comprising:

a translucent sheet positioned on the cell for protecting the cell from contaminants without completely blocking light influx onto the cell.

3. The system of claim 1, wherein the cell comprises a photovoltaic cell.

4. The system of claim 3, wherein the photovoltaic cell is covered by a protective translucent cover.

5. The system of claim 1, wherein the means for controlling the rate of current flowing into the battery comprises a switch that includes a receiving socket for receiving the electrical connector.

6. The system of claim 1, wherein the means for controlling the rate of current flowing into the battery comprises a switch that includes a variable current flow switch for controlling a variable rate of current flow to the battery.

7. The system of claim 1, wherein the means for controlling the rate of current flowing into the battery comprises a switch that includes an on/off switch for allowing either a full flow of current to the battery or no flow at all.

8. A method of charging or maintaining the charge of a battery, the method comprising:

exposing a plurality of parallel energy-transforming cells to a light source, each cell being able to convert light energy received from a light source into electrical current; and communicating the electrical current produced by each cell with the battery using an electrical connector, wherein each cell has its own independent electrical connector and switch distinct from electrical connectors and switches of other cells, thereby maintaining the charge of the battery.

9. The method of claim 8, wherein the switch comprises a receiving socket for receiving the electrical connector.

10. The method of claim 9, wherein the receiving socket comprises a cigarette lighter receiving socket.

11. The method of claim 8, wherein the switch comprises a variable current flow switch for controlling a variable rate of current flow to the battery.

12. The method of claim 8, wherein the switch comprises an on/off switch for allowing either a full flow of current to the battery or no flow at all.

13. The method of claim 8, wherein the battery is in a vehicle.

*14. A system for charging or maintaining a charge of a battery, comprising:*

*a plurality of energy-transforming cells to convert light energy into electrical energy;*

*a platform on which to mount the plurality of energy-transforming cells;*

*a plurality of electrical connectors, each electrical connector associated with a different one of the plurality of energy-transforming cells; and*

*a switch to control flow of electric current to the battery, each of the plurality of electrical connectors to couple one of the plurality of energy-transforming cells to the switch.*

*15. The system of claim 14, further comprising a translucent sheet positioned to protect the plurality of energy-transforming cells from contaminants without completely blocking light influx onto the plurality of energy transforming cells.*

*16. The system of claim 15, wherein each of the plurality of energy-transforming cells comprises a photovoltaic cell.*

*17. The system of claim 14, wherein the switch further comprises a receiving socket for receiving each of the plurality of electrical connectors.*

*18. The system of claim 14, wherein the switch to control flow of electric current into the battery further comprises a variable electric current flow switch to control a variable rate of electric current flow to the battery.*

*19. The system of claim 14, wherein the switch to control flow of electric current to the battery further comprise an on/off switch for allowing either a full flow or no electric current flow to the battery.*

*20. The system of claim 14, wherein the platform is portable and the electric current is one of alternating current and direct current.*

*21. An apparatus for charging or maintaining a charge of a battery, comprising:*

*a plurality of energy-transforming cells to convert light energy into electrical energy;*

*a plurality of electrical connectors, each of the plurality of electrical connectors associated with a different one of the plurality of energy-transforming cells; and*

*a switch to control flow of electric current to the battery, each of the plurality of electrical connectors to couple one of the plurality of energy-transforming cells to the switch.*

*22. The apparatus of claim 21, further comprising a translucent sheet positioned to protect the plurality of energy-transforming cells from contaminants without completely blocking light influx onto the plurality of energy-transforming cells.*

*23. The apparatus of claim 22, wherein each of the plurality of energy-transforming cells comprises a photovoltaic cell.*

*24. The apparatus of claim 21, wherein the switch further comprises a receiving socket for receiving each of the plurality of electrical connectors.*

*25. The apparatus of claim 21, wherein the switch to control flow of electric current into the battery further comprises a variable electric current flow switch to control a variable rate of electric current flow to the battery.*

*26. The apparatus of claim 21, wherein the switch to control flow of electric current to the battery further comprises an on/off switch for allowing either a full flow or no electric current flow to the battery.*

*27. The apparatus of claim 21, wherein the electric current is one of alternating current and direct current.*

* * * * *